No. 822,919. PATENTED JUNE 12, 1906.
F. J. BROWN.
EAR CARRIAGE DEVICE FOR HORSES.
APPLICATION FILED FEB. 17, 1906.

Witnesses.
Inventor.
F. J. Brown.

UNITED STATES PATENT OFFICE.

FRANCIS JOSEPH BROWN, OF MEADOWVALE, CANADA.

EAR-CARRIAGE DEVICE FOR HORSES.

No. 822,919.　　　Specification of Letters Patent.　　　Patented June 12, 1906.

Application filed February 17, 1906. Serial No. 301,699.

*To all whom it may concern:*

Be it known that I, FRANCIS JOSEPH BROWN, of the village of Meadowvale, in the county of Peel, in the Province of Ontario, Canada, have invented certain new and useful Improvements in Ear-Carriage Devices for Horses, of which the following is a specification.

My invention relates to improvements in ear-carriage devices for horses; and the object of the invention is to improve the appearance and general carriage of the horse by making him hold his head up, and thereby do away with the use of the checkrein and the cruelty incident thereto; and it consists, essentially, of a clip designed to be secured on the top of the neck-band of the bridle and having forwardly-projecting arms with curved lateral extensions designed to extend behind the ears, the clip being also provided with hooks whereby the arms may be held back, so that the curved lateral extensions will not press against the back of the ears, and the parts being arranged and constructed in detail as hereinafter more particularly explained.

Figure 1:
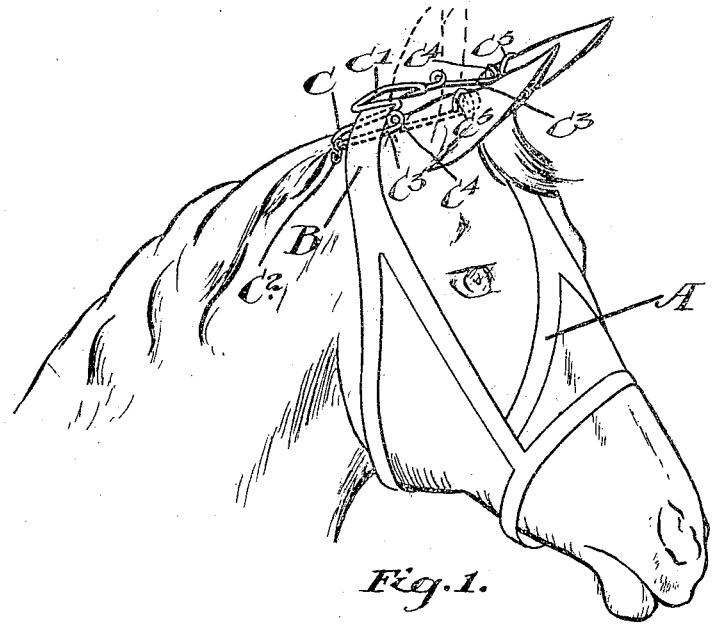
Figures 2, 3, 4:
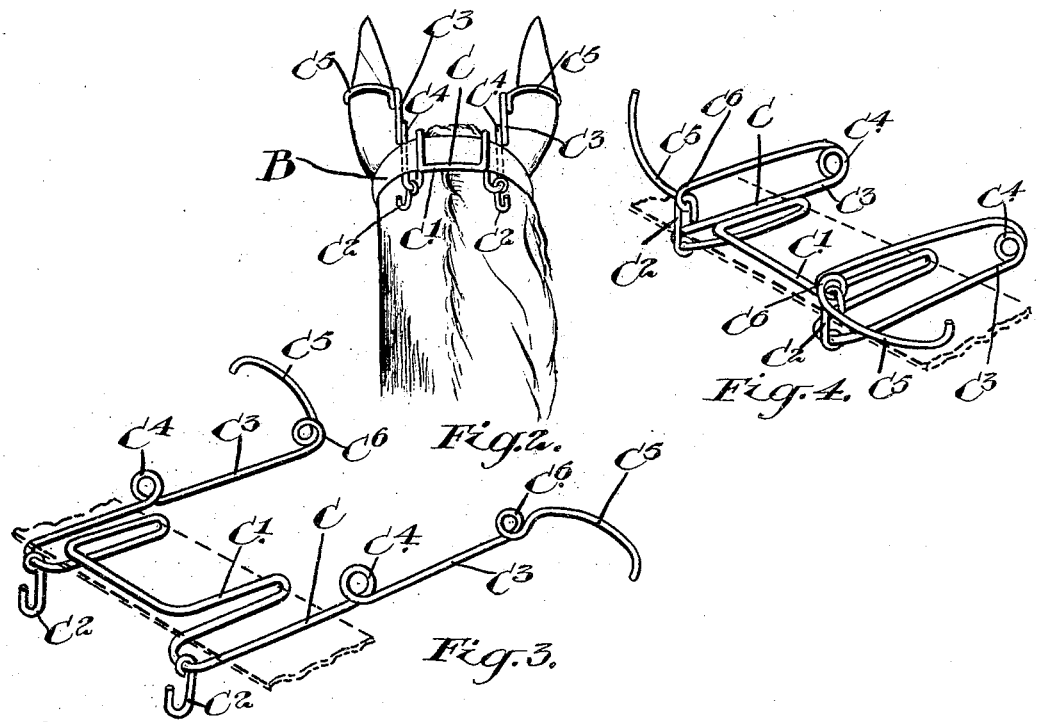

Figure 1 is a perspective view of a horse's head, showing the adaptability of my device. Fig. 2 is a view from the back of the head of the horse. Fig. 3 is an enlarged detail showing the arms extended. Fig. 4 is an enlarged detail showing the arms held back from the hooks.

In the drawings like letters of reference indicate corresponding parts in each figure.

It is well known to those accustomed to the care of horses that if a horse holds its ears forward it always holds its head up, it seeming to be a natural tendency so to do. I have taken advantage of this tendency in a horse in the carrying out of my invention.

A is the bridle of the horse, and B the upper head and neck strap.

C is my ear-carriage device, formed, preferably, of spring-wire and comprising the substantially rectangular central loop $C'$, bent back upon itself to form a gripping-clip designed to be placed so as to straddle the head-strap of the bridle. The outer ends of each end of the clip are in loop form and have connected to them at the rear the swinging hooks $C^2$.

$C^3$ represents the forwardly-projecting side arms, which are shown provided with a central loop $C^4$ to increase their resiliency; but this loop may not be used as long as the wire is sufficiently resilient. The forward ends of the arms are provided with substantially reverse lateral extensions $C^5$, also provided at the inner end with a curl $C^6$ to increase the resiliency of the lateral extensions.

It will be noticed, on reference to Fig. 1, the way my invention is placed on the horse's head with the reverse U-shaped extensions behind the ear, thereby forcing the ear forwardly, as indicated.

In Fig. 4 the device is shown contracted, so that the ears will be left free. In Fig. 4 also the hooks $C^2$ are connected to the eyes formed by the curl $C^6$, the arms $C^3$ being bent backwardly upon themselves, as indicated.

By such a device as I describe I am enabled to insure of the horse's ears extending forwardly, and thereby the horse holding its head up, thus not only effecting the carriage of the ear, but the carriage of the head, which, it will be understood by a horseman, is an important desideratum.

What I claim as my invention is—

1. An ear-carriage device for horses comprising two spring-arms designed to extend behind the horse's ears, and means for fastening them in position on the horse's head as and for the purpose specified.

2. An ear-carriage device for horses comprising two spring-arms designed to extend behind the horse's ears, and a clip device connecting them together and designed to be fastened on the top of the horse's head as and for the purpose specified.

3. An ear-carriage device for horses comprising two spring-arms designed to extend behind the horse's ears, and a clip device connecting the spring-arms together and made in the form of a folded loop designed to straddle the strap of the bridle extending over the horse's head as and for the purpose specified.

4. An ear-carriage device for horses comprising spring-arms having laterally-curved extensions at the free ends designed to fit behind the horse's ears and a device connecting the arms and designed to be fastened to the strap of the bridle at the top of the horse's head as and for the purpose specified.

5. An ear-carriage device for horses comprising spring-arms having laterally-curved extensions at the free ends designed to fit behind the horse's ears, a device connecting the arms and designed to be fastened to the strap of the bridle at the top of the horse's head, the said arms having a curl intermediate of their length and a curl in proximity to the laterally-extending portion and hooks fastened at the rear end of the arms and designed to extend into the curls in proximity to the lateral extension to hold the arms folded back as and for the purpose specified.

FRANCIS JOSEPH BROWN.

Witnesses:
B. BOYD,
E. McEACHENN.